United States Patent
Jose Chiriyankandath

(10) Patent No.: US 9,942,294 B1
(45) Date of Patent: Apr. 10, 2018

(54) SYMMETRIC AND CONTINUOUS MEDIA STREAM FROM MULTIPLE SOURCES

(71) Applicant: Western Digital Technologies, Inc., Irvine, CA (US)

(72) Inventor: Cipson Jose Chiriyankandath, Santa Clara, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 277 days.

(21) Appl. No.: 14/673,544

(22) Filed: Mar. 30, 2015

(51) Int. Cl.
*G06F 15/16* (2006.01)
*H04L 29/06* (2006.01)
*H04L 29/08* (2006.01)

(52) U.S. Cl.
CPC .............. *H04L 65/60* (2013.01); *H04L 67/06* (2013.01); *H04L 67/32* (2013.01)

(58) Field of Classification Search
CPC ... H04L 67/02; H04L 63/0209; H04L 63/029; H04L 67/125; H04L 67/2814
See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |
| 8,004,791 B2 | 8/2011 | Szeremeta et al. | |
| 8,255,661 B2 | 8/2012 | Karr et al. | |
| 8,285,965 B2 | 10/2012 | Karr et al. | |
| 8,341,117 B2 | 12/2012 | Ram et al. | |
| 8,341,275 B1 | 12/2012 | Hesselink et al. | |
| 8,352,567 B2 | 1/2013 | Hesselink et al. | |

(Continued)

OTHER PUBLICATIONS

Dean M. Jenkins, et al., U.S. Appl. No. 13/920,437, filed Jun. 18, 2013, 18 pages.

*Primary Examiner* — Moustafa M Meky
*Assistant Examiner* — Andrea Hurst
(74) *Attorney, Agent, or Firm* — Chang & Hale LLP

(57) ABSTRACT

A data storage device may comprise a network interface configured to couple to a computer network; a memory configured to store at least one of a first, second and third media file, at least two of the first to third media files being configured differently from one another; and a processor coupled to the memory and to the network interface. The processor may be configured to generate a media stream by at least sequentially applying at least one filter to one or more of the first to third media files; sequentially reformatting one or more of the first to third media files such that each or some substantially conforms to a common format; ordering the filtered and/or reformatted media files according to a selectable metric; aggregating the media files together to generate the media stream; and making the media stream accessible to the computer network over the network interface.

19 Claims, 4 Drawing Sheets

(56) References Cited

U.S. PATENT DOCUMENTS

| | | | |
|---|---|---|---|
| 8,510,383 B2 | 8/2013 | Hurley et al. | |
| 8,526,798 B2 | 9/2013 | Hesselink | |
| 8,631,284 B2 | 1/2014 | Stevens | |
| 8,646,054 B1 | 2/2014 | Karr et al. | |
| 8,661,507 B1 | 2/2014 | Hesselink et al. | |
| 8,688,797 B2 | 4/2014 | Hesselink et al. | |
| 8,713,265 B1 | 4/2014 | Rutledge | |
| 8,762,682 B1 | 6/2014 | Stevens | |
| 8,780,004 B1 | 7/2014 | Chin | |
| 8,793,374 B2 | 7/2014 | Hesselink et al. | |
| 8,819,443 B2 | 8/2014 | Lin | |
| 8,935,322 B1 * | 1/2015 | Grosz | G06F 3/04842 709/203 |
| 2005/0143136 A1 * | 6/2005 | Lev | H04L 12/5835 455/566 |
| 2005/0144195 A1 | 6/2005 | Hesselink et al. | |
| 2005/0144200 A1 | 6/2005 | Hesselink et al. | |
| 2009/0303676 A1 * | 12/2009 | Behar | G06F 1/162 361/679.27 |
| 2010/0169786 A1 * | 7/2010 | O'Brien | G06F 17/30817 715/738 |
| 2011/0060994 A1 * | 3/2011 | Maxwell | G06F 3/147 715/730 |
| 2011/0072366 A1 * | 3/2011 | Spencer | G06Q 40/04 715/757 |
| 2012/0036041 A1 | 2/2012 | Hesselink | |
| 2013/0212401 A1 | 8/2013 | Lin | |
| 2013/0266137 A1 | 10/2013 | Blankenbeckler et al. | |
| 2013/0268749 A1 | 10/2013 | Blankenbeckler et al. | |
| 2013/0268759 A1 | 10/2013 | Blankenbeckler et al. | |
| 2013/0268771 A1 | 10/2013 | Blankenbeckler et al. | |
| 2013/0325870 A1 * | 12/2013 | Rouse | G06F 17/30707 707/741 |
| 2014/0067955 A1 * | 3/2014 | Christian | H04W 4/02 709/204 |
| 2014/0082079 A1 * | 3/2014 | Dunsmuir | H04L 65/4084 709/204 |
| 2014/0095439 A1 | 4/2014 | Ram | |
| 2014/0136733 A1 * | 5/2014 | Dunsmuir | H04N 21/8547 709/248 |
| 2014/0169921 A1 | 6/2014 | Carey | |
| 2014/0173215 A1 | 6/2014 | Lin et al. | |
| 2014/0195921 A1 * | 7/2014 | Grosz | G06F 3/1242 715/738 |
| 2014/0267339 A1 * | 9/2014 | Dowd | H04L 63/0428 345/581 |
| 2014/0280755 A1 * | 9/2014 | Memon | H04L 67/02 709/219 |
| 2014/0328569 A1 | 11/2014 | Strobl et al. | |
| 2014/0331141 A1 * | 11/2014 | Tijssen | G06F 3/0482 715/738 |
| 2014/0359011 A1 * | 12/2014 | Varenhorst | H04L 65/403 709/204 |
| 2015/0200785 A1 * | 7/2015 | Gupta | H04L 12/1822 709/204 |
| 2016/0140699 A1 * | 5/2016 | Dhawan | G06T 5/005 382/195 |
| 2016/0142889 A1 * | 5/2016 | O'Connor | H04W 4/206 705/44 |
| 2017/0032434 A1 * | 2/2017 | Ker | G06Q 30/06 |

\* cited by examiner

SYMMETRIC AND CONTINUOUS MEDIA STREAM FROM MULTIPLE SOURCES

BACKGROUND

Users of mobile devices, be they smart phones, cameras, tablets and the like, generate an enormous amount of rich media content. Such rich media content may include, for example, photos, audio recordings and video recordings. Increasingly, users utilize so-called cloud-based storage solutions to archive this content. These cloud-based solutions may take the form of remote backup services and/or network attached storage devices. Alternatively, this media content may simply be stored in an electronic device such as a personal computer or an external data storage device. Different mobile devices generate media having different characteristics, such as formats, naming conventions, photo extensions, photo orientation, color depth, resolution, size, metadata, etc.

DETAILED DESCRIPTION

Because of the disparate nature of the characteristics of stored media content, such content may not be enjoyed too often after the creation thereof, as the widely-varying nature of the media files effectively makes any logical, temporal or thematic aggregation thereof impractical. They are, literally, snapshots in time and do not give the viewer any sense of narrative or context. Moreover, the stored photos, videos and other recordings remain discrete items, seemingly unconnected to one another. As a result, the stored memories languish in storage and may eventually be forgotten.

Figure 1:
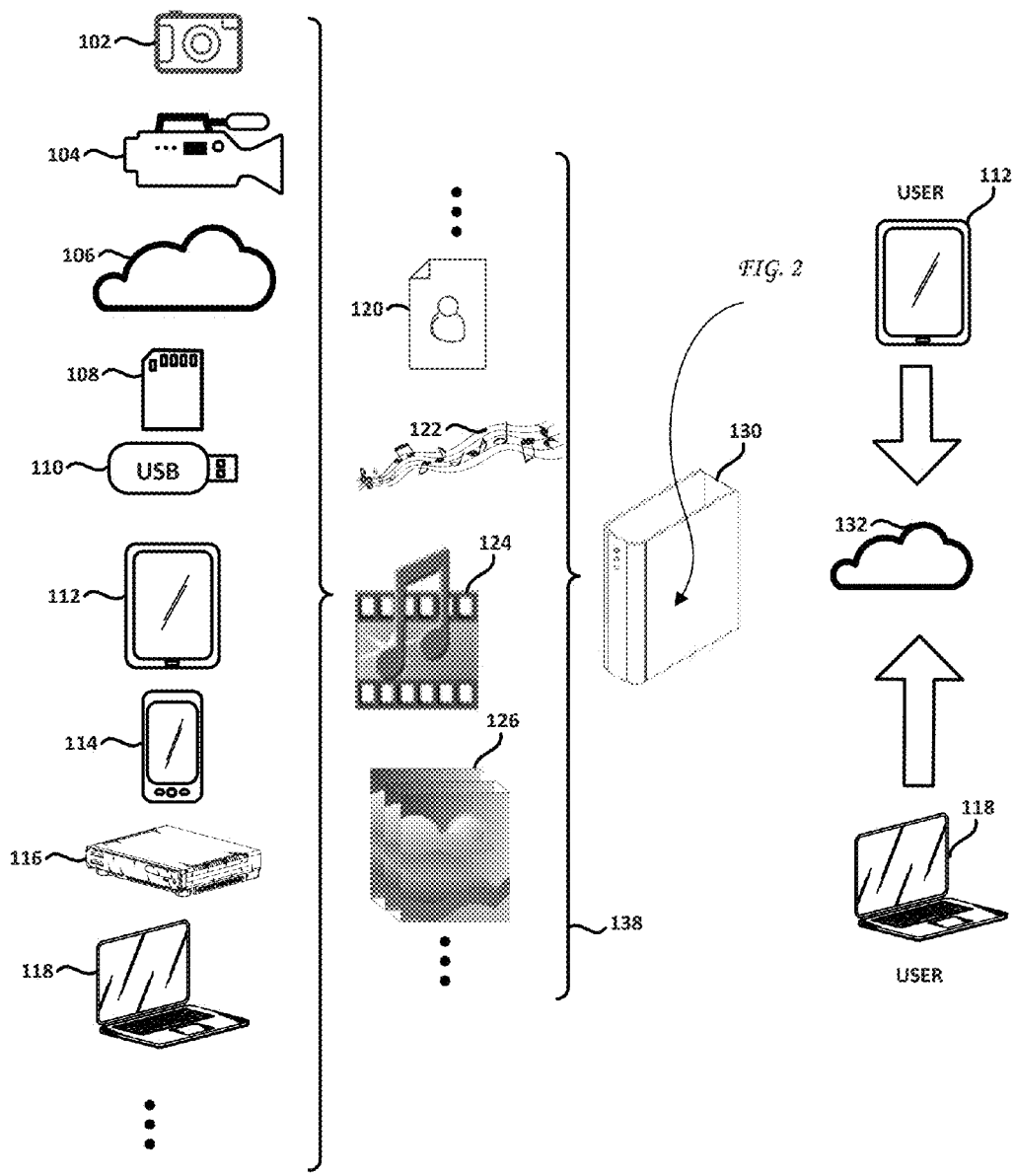
FIG. 1 is a block diagram of a method and device with which one embodiment may be practiced.

FIG. 1 is a block diagram of a method and device with which one embodiment may be practiced. As shown, consumers now routinely use a wide variety of electronic devices and services configured to generate or provide access to, rich media content such as, for example, photos, videos, sound recordings and/or other types of rich content, such as Virtual Reality (VR) content. Such computing devices (mobile and otherwise) and services, include cameras 102, video cameras 104, cloud-based services 106, solid state memory devices (pre-loaded or filed with user content) including Micro-SD cards 108, Flash-based storage devices 110, tablet computers 112, mobile phones 114, video recorders 116 and/or computing devices such as laptops 118. These devices are capable of generating a variety of rich media content such as, for example, photos 120, sound recordings 122, video recordings 124 and VR content, as suggested at 126. Each of these types of rich media content may be generated and/or saved in a variety of formats, such as, for example, .raw, .jpg, .mov, .mp3, .mp4, .avi, .wmv or .qtvr (QuickTime VR), among a veritable alphabet soup of other file extensions. Likewise, each of these media file formats may come in a variety of sizes, resolutions, aspect ratios, color palette, color depth, length, brightness, saturation and/or orientation. Moreover, some of these files 120-126 may comprise metadata associated therewith, while others may not include any metadata. The metadata itself may be formatted differently and include different information across media file types, according to the device or service originating the content or according to user-originated tags or storage locations.

As suggested at 138, these media files 120, 122, 124, 126 may be stored in an electronic device such as shown at 130. This electronic device may include a standalone data storage device, a computing device, storage that is accessible over a computer network, a storage area network or, as shown in FIG. 1 at 130, a Network Attached Storage (NAS). In turn, this NAS may be accessed by users of devices such as shown at 112 and/or 118 over a computer network, such as shown at 132. According to one embodiment, the electronic device 130 may be configured to carry out a computer-implemented method, such as shown in and described relative to FIG. 2.

Figure 2:
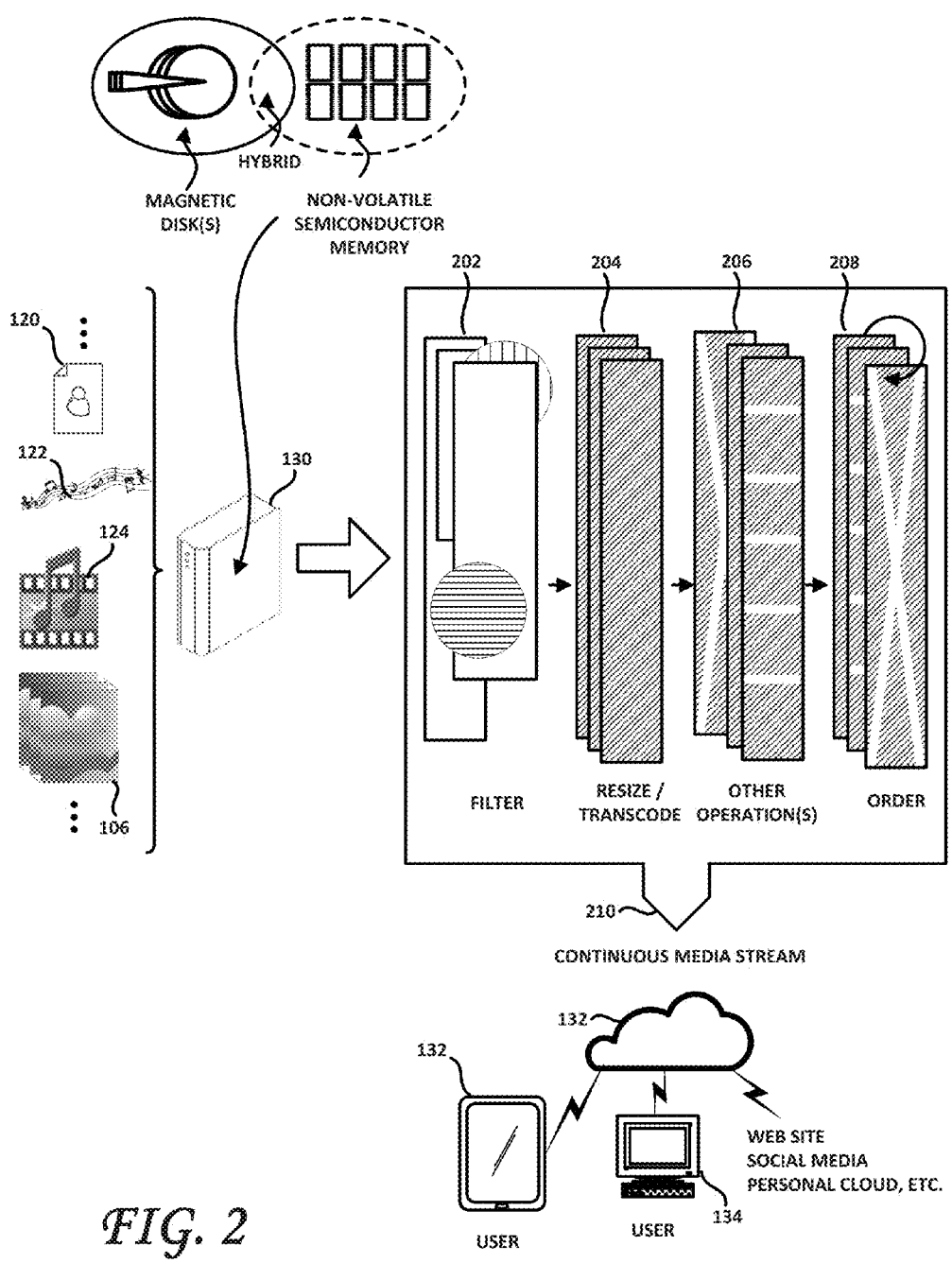
FIG. 2 is a block diagram of a method and device with which one embodiment may be practiced.
Figure 4:
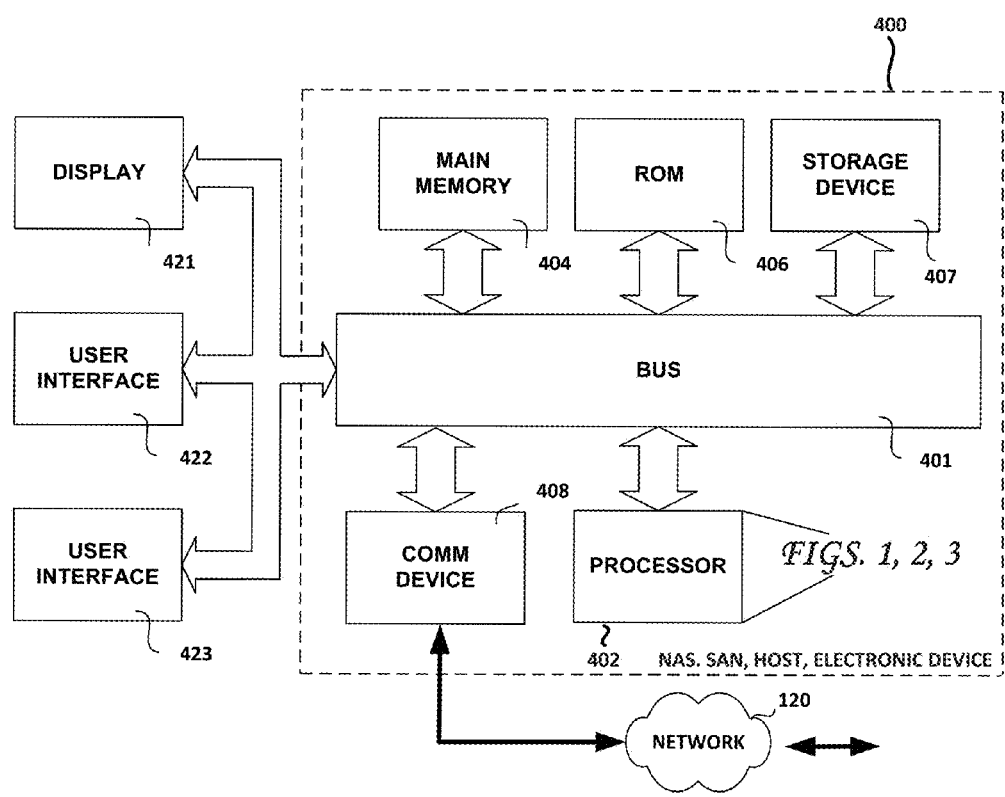
FIG. 4 is a block diagram of an electronic device configured according to one embodiment.

FIG. 2 is a block diagram of a computer-implemented method according to one embodiment and a device configured to carry out such a method. FIG. 2 shows a network attached storage device 130 to which one or more of photos 120, audio recordings 122, video recordings 124 and/or other types of media such as shown at 106 may be stored. The network attached storage 130 may comprise one or more spinning magnetic disks or may comprise solid state memory such as Flash memory. Alternatively still, the network attached storage may be a hybrid device, comprising both spinning magnetic disks and Flash memory. According to one embodiment, and as shown in FIG. 4, the network attached device 130 may comprise a network interface 408 configured to couple to a computer network 120 and memory such as shown at 404 in FIG. 4. The memory, however configured or constituted, may be configured to store one or more media files, with at least two the of the media files being configured differently from one another. Indeed, the network attached storage 130 (or, generically, electronic or data storage device 130) may be configured to store and/or access a plurality of media files of different types. Specifically, some of the media files stored in device 130 and/or accessible thereby may be configured differently from one another with respect to, for example, size, file format, file type, length, orientation, resolution, orientation, color depth, brightness and color palette, among other possible differentiators. As shown at 402 in FIG. 4, the device 130 may also comprise one or more processors 402. The processor(s) 402 may be coupled to the memory 404 and to the network interface 408 over bus 401 and may be configured, according to one embodiment, to generate a media stream from at least some of the media files stored therein or accessible thereby.

According to one embodiment, this media stream may be generated by, as shown in FIG. 2, the processor(s) 402, configured by instructions, sequentially applying one or more filters to one or more of the files that may be included in the media stream to be generated. Such filters may operate, according to one embodiment, to at least somewhat homogenize (and/or change as needed) the media files such that they appear to form a cohesive and seamless whole, when sequentially streamed together. That is, the photos, videos and the like that are selected to become constituent members of the generated media stream may be filtered so as to fit together, one after the other, in a pleasing and fluid manner. For example, the constituent photos, videos and the like may be changed as needed to make them appear, for example, to have been generated from a single source, appear to form a single narrative, form an visually-pleasing sequence and/or form a logically-ordered media stream. For example, overly bright images or videos (at least compared to others in the stream) may be toned down in brightness somewhat through the use of appropriate filters. Similarly, the color palette may be adjusted through the use of filters such that adjacent photos and videos in the generated stream follow each other without brusque transitions. Videos or photos of the stream may be adjusted to smooth out transitions between them as they are rendered one after the other. It is to be understood that, herein, the term "filter" and "filters" explicitly encompasses most any digital manipulation of images, videos or VR data.

For example, such digital manipulation may include, for example, increasing or decreasing exposure, adding or subtracting light, increasing or decreasing contrast and/or tint, adding sepia tone and a warmer or cooler color temperature, increasing or decreasing saturation, emphasizing or de-emphasizing shadows, convert to grayscale or black and white, vignetting, adding borders or fade-away portions, increasing glow or harshness of an image or subject, fading the image, add effects to image and/or edges, antiquing the image, add selected monochromatic tint, saturating or de-saturating the image, emphasizing or de-emphasizing selected colors, among the myriad of possibilities. All such techniques and other digital image processing techniques may be applied here and are collectively denoted herein and shown in FIG. 2 as "filters" 202. According to one embodiment, a media file may be evaluated and omitted from the media stream to be generated when determined to be unsuitable for inclusion in such a media stream. Indeed, one or more characteristics of the image or video may render it unsuitable for inclusion in the media stream. Such unsuitability may be determined on the basis of metadata (it does not fit within the timeline of the media stream), appearance (too low resolution, incompatible colors, too dark, too light or too blurry), format, aspect ratio, subject matter (a portrait when the media stream is about sunsets, for example) or most any reason.

Thereafter, as shown at 204 in FIG. 2, the filtered images, videos and the like may be resized and/or transcoded to a common or at least mutually-compatible format. For example, all images and videos may be converted to a common 6:9 aspect ratio, portrait orientation and all .raw images may be sequentially converted to lower-resolution .jpg pictures. The resolution of videos may also be decimated, to render them more amenable to streaming over a public computer network. Other format and/or size manipulations may be carried out at 204. Other image manipulations may be carried out at 206, such as cropping, cutting out undesirable portions of images or videos, limiting the length of videos to be included in the generated media stream, among many other possible operations that may be carried out on the constituent pieces of rich media of the media stream to be generated. For example, the constituent images that are to form a part of the media stream may be processed in such a manner as to make them readily sent to and rendered by mobile devices over unreliable networks. At 208, the images, videos and other types of media files may be re-ordered as needed, so as to fix their location in the media stream. Such re-ordering may be carried out according to most any criteria or metric, whether temporal, event based (a birthday, for example), similar colors or textures, or based upon any criteria. It is to be noted that the order shown at 202, 204, 206, 208 is not fixed, as the media files may be re-ordered and resized or transcoded before any filters are applied, for example.

The thus-processed media files may now, according to one embodiment, be stitched together to generate the media stream, represented in FIG. 2 at 210. Herein, "stitched together" encompasses any process by which the constituent media files may be outputted in sequence and over time, in succession, to a destination, whether such destination is directly coupled to device 130 or indirectly thereby via a computer network, as shown at 132. Such stitching together may comprise, therefore, generating a linked list of processed images or videos to be outputted from the device 130 or made available therefrom. For example, a link to the generated stream may be published or otherwise made available to others, such as 132 and 134 over computer network 132. Alternatively or in addition, the generated stream may be published or posted to a remote site on the network, such as a social media site or private blog.

The filtered, resized and/or re-formatted and/or otherwise processed media files that are to become part of the media stream to be generated may, according to one embodiment, be stored, either locally within device 130 or at some remote location over the computer network. Thumbnails of the filtered, resized, reformatted and/or otherwise processed media files may also be stored, to enable the user to select therefrom to assembly his or her own user-defined media stream.

Media streams, according to one embodiment, may be assembled, logically aggregated or otherwise associated with one another, based on one or more of a plurality of selectable criteria or metrics. Such criteria or metrics may include, for example, creation time, theme, subject, predominant colors and/or media file metadata. For example, the media file metadata may be used to select those media files having metadata indicating the media file was created in the Lake Tahoe North Shore in 2012, as well as those files containing boats on the water at sunset. Such criteria or metrics may be presented to the user as a forced choice and/or selected automatically, to present the user with new and unexpected media streams based upon associations the user may never have come up with on his or her own. This, it is believed, will contribute to a greater enjoyment and indeed use of the user's media files. Moreover, the processor 402 of the device 130 may be further configured to generate one or more media streams from media files stored locally or elsewhere (such on a user's social media feed, for example) independently of any user request. In this manner, the device 130 may carry out an embodiment, generate a media stream as detailed herein and signal the availability thereof to the user, who may or may not indicate, via a user interface, his or her wish to view the independently-generated media stream.

As shown, disparate media content from various sources may be combined into a continuous stream. To enhance the stream's appearance of continuity, various filters, cropping, resizing, color themes may be applied to seamlessly blend each previously discrete piece of media into a continuous whole.

According to one embodiment, a host of an event may collect photos and other media from different participants and a media stream may be generated as detailed above and made available to all or selected event participants. In this manner, interested parties may be invited to view a stream of the entire event and enjoy the underlying content, without having to preoccupy themselves with details of the media such as photo formats, naming conventions, photo extensions, photo orientation, color depth, resolution, size etc. According to one embodiment, tagged metadata may be used not only to order the constituent pieces of media content, but also to thematically group like pieces of media together by, for example, faces, geo-location, event, etc.

Figure 3:
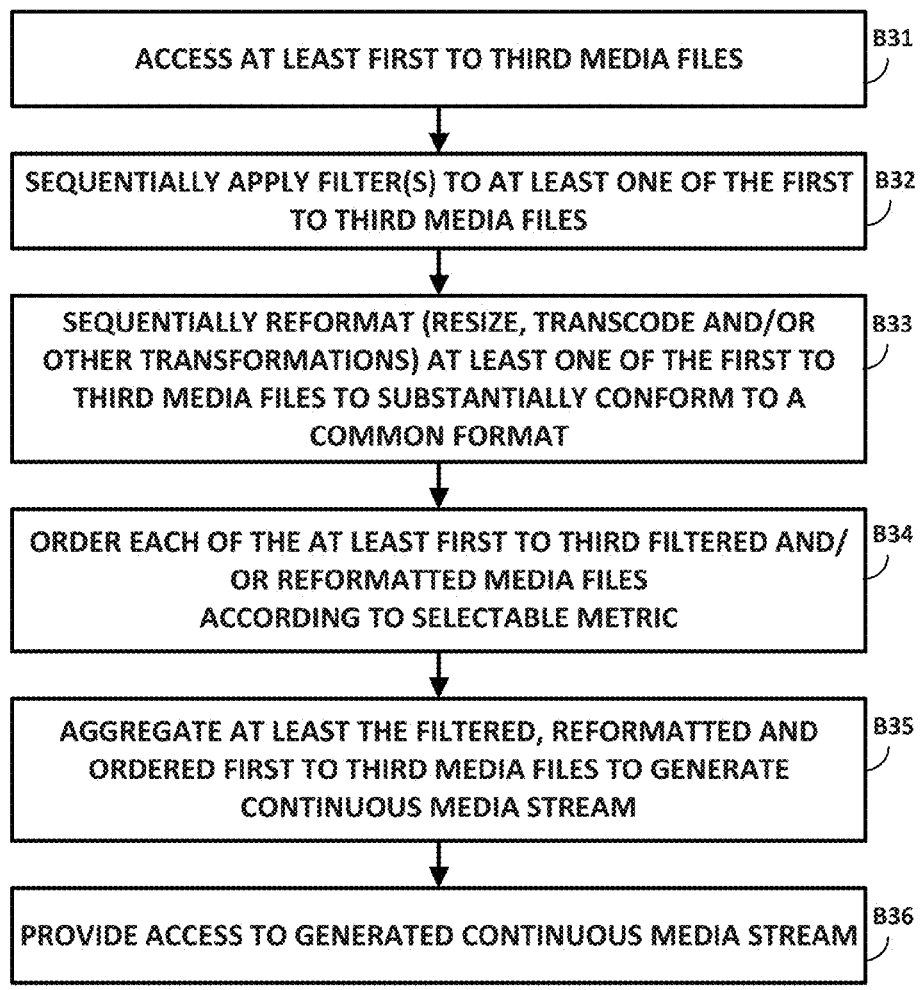
FIG. 3 is a flowchart of one embodiment.

FIG. 3 is a block diagram of a method according to one embodiment. The method may be implemented, for example, by a network attached storage or other data storage device comprising memory configured to store a first media file; a second media file and/or a third media file, at least two of which being configured differently from one another. Any or all of the first to third media files may comprise a photo or a video, for example. The method may comprise accessing at least first to third media files, as shown at B31. Block B32 of FIG. 3 calls for sequentially applying one or more filters (e.g., any kind of digital manipulation) to one or more of the first to third media files. One or more of the first to third (and others, if present) media files may then be sequentially reformatted, such that each or at least some substantially conform to a common format, as shown at B33. Block B34 then calls for ordering the first to third media files (and any others that may have been selected for inclusion in the stream to be generated) according to a selectable metric or metrics. This selectable metric(s) may comprise, for example, creation time, theme, subject, predominant colors and media file metadata and/or a combination of such metrics. Then, the ordered media files may then, as shown at B35, be aggregated together to generate a media stream. Such aggregation may take the form of a logical aggregation by associating each constituent media file with the media stream to be generated, as physical aggregation may not be required. At B36, the thus-generated (or otherwise prepared) media stream may be made accessible to others on a computer network, over a network interface. The NAS or other data storage or computing device implementing the method shown in FIG. 3 and described herein may generate the media stream (or prepare the constituent media files for inclusion in such a media stream) independently of any request from a user of the network attached storage device. Provisions may be made for generating such a media stream on demand, with the user controlling none, some or all of the media stream generation steps discussed and shown herein.

According to one embodiment, at least two of the first to third media files may be configured differently from one another with respect to, for example, size, file format, file type, length, orientation, resolution, orientation, color depth, brightness and/or color palette, to identify but a few differentiators. Fourth to nth media files may also be selected for potential inclusion in the media stream. For at least some of the media files, their suitability for inclusion in the media stream may be determined. Those media files that are determined to be unsuitable for inclusion in the media stream to be generated may be omitted therefrom. For each or some of the first to nth media files, it may be determined whether they are too dark, too light or too blurry (and/or do not meet some other criteria), according to predetermined respective thresholds, and those that are too dark or too blurry (or otherwise unsuitable) may be omitted from the media stream. The aggregating of block B35 in FIG. 4 may comprises causing the stitched together, aggregated or otherwise associated first to third media files to transition smoothly from one media file to the next media file in the generated media stream.

FIG. 4 illustrates a block diagram of a computing device 400 with which an embodiment may be implemented. Computing device 400 may comprise, for example, a NAS, a SAN, a host, server and/or other electronic devices. Computing device 400 may comprise a bus 401 or other communication mechanism for communicating information, and one or more processors 402 coupled with bus 401 for processing information. The processor(s) 402 may be configured to carry out the functionality shown and described relative to FIGS. 1, 2 and 3. Computing device 400 may further comprise a random access memory (RAM) 404 or other dynamic storage device 404, coupled to bus 401 for storing information and instructions to be executed by processor 402. Main memory 404 also may be used for storing temporary variables or other intermediate information during execution of instructions by processor 402. Computing device 400 may also comprise a read only memory (ROM) and/or other static storage device 406 coupled to bus 401 for storing static information and instructions for processor 402. A data storage device 407, such as a magnetic, solid state and/or optical disk, may be coupled to bus 401 for storing information and instructions. A network interface device 408, such as a modem or network (such as Ethernet, for example) card may also be coupled to the bus 401 to provide access to a network, such as shown at 132 in FIGS. 1 and 2.

The computing device 400 may also be coupled via bus 401 to a display device 421 for displaying information to a computer user. Other user interface mechanisms may be provided, as shown at 422 and 423 for communicating direction information and command selections to processor 402. One embodiment is related to the use of a computing device 400 configured for providing and/or receiving a schema object over a LAN, as shown and as described herein. According to one embodiment, the processing described herein may be carried out by one or more computing devices 400 in response to processor(s) 402 executing sequences of instructions contained in a memory 404. Such instructions may be read into memory 404 from another computer-readable, tangible and non-transitory medium, such as data storage device 407 and/or from a remotely located server. Execution of the sequences of instructions contained in memory 404 may causes processor(s) 402 to implement the functionality described above. In alternative embodiments, hard-wired circuitry may be used in place of or in combination with software instructions to implement an embodiment. Thus, the described embodiments are not limited to any specific combination of hardware circuitry and software.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A network attached storage device, comprising:
   a network interface configured to couple to a computer network;
   a memory configured to store at least one of a first media file, a second media file, and a third media file, wherein at least two of the first to third media files are configured differently from one another; and
   a processor coupled to the memory and to the network interface, the processor being configured to generate a single media stream by at least:
      sequentially applying at least one filter to at least one of the first to third media files;
      sequentially reformatting at least one of the first to third media files such that each of the first to third media files substantially conforms to a common format;
      ordering the first to third media files according to a selectable metric;
      aggregating the first to third media files together to generate the single media stream, wherein the first to third media files substantially conform to the common format;
      accessing fourth to $n^{th}$ media files for potential inclusion in the single media stream;
      omitting any of the first to $n^{th}$ media files from the single media stream that are determined to be at least one of too dark, too light, or too blurry, according to predetermined respective thresholds; and
      making the single media stream accessible to the computer network over the network interface.

2. The network attached storage device of claim 1, wherein the at least two of the first to third media files are configured differently from one another with respect to at least one of size, file format, file type, length, resolution, orientation, color depth, brightness, and color palette.

3. The network attached storage device of claim 1, wherein the processor is further configured to access at least one of the fourth to $n^{th}$ media files over the computer network.

4. The network attached storage device of claim 1, wherein the processor is further configured to access at least one of the fourth to $n^{th}$ media files from the memory.

5. The network attached storage device of claim 1, wherein the processor is further configured to store any of the filtered or reformatted files of the first to third media files in the memory.

6. The network attached storage device of claim 1, wherein the processor is further configured to cause the aggregated first to third media files to transition smoothly from one of the first to third media files to a next one of the first to third media files in the single media stream.

7. The network attached storage device of claim 1, wherein the selectable metric includes at least one of: creation time, theme, subject, predominant colors, and media file metadata.

8. The network attached storage device of claim 1, wherein:
   at least one of the first to third media files is a video file;
   at least one other one of the first to third media files is a photo file; and
   the processor is configured to generate the single media stream to comprise at least the video file and the photo file.

9. The network attached storage device of claim 1, wherein the processor is further configured to download, via the network interface, at least one of the first to third media files from a remote site on the computer network.

10. The network attached storage device of claim 1, wherein the processor is configured to generate the single media stream independently of any request from a user of the network attached storage device.

11. A method implemented by a network attached storage device comprising memory configured to store at least one of a first media file, a second media file, and a third media file, wherein at least two of which are configured differently from one another, the method comprising:
   sequentially applying at least one filter to at least one of the first to third media files;
   sequentially reformatting at least one of the first to third media files such that each of the first to third media files substantially conforms to a common format;
   ordering at least each of the first to third media files according to a selectable metric;
   aggregating at least the ordered first to third media files together to generate a single media stream;
   accessing fourth to $n^{th}$ media files for potential inclusion in the single media stream;
   omitting any of the first to $n^{th}$ media files from inclusion in the single media stream that are determined to be at least one of too dark, too light, or too blurry, according to predetermined respective thresholds; and
   making the single media stream accessible to a computer network over a network interface.

12. The method of claim 11, wherein the at least two of the first to third media files are configured differently from one another with respect to at least one of size, file format, file type, length, resolution, orientation, color depth, brightness, and color palette.

13. The method of claim 11, wherein aggregating together comprises causing the aggregated first to third media files to transition smoothly from one of the first to third media files to a next one of the first to third media files in the single media stream.

14. The method of claim 11, wherein the selectable metric comprises at least one of creation time, theme, subject, predominant colors, and media file metadata.

15. The method of claim 11, wherein:
   at least one of the first to third media files is a video file;
   at least one other one of the first to third media files is a photo file; and
   generating comprises including the video file and the photo file in the single media stream.

16. The method of claim 11, wherein generating the single media stream comprises generating the single media stream independently of any request from a user of the network attached storage device.

17. An electronic device, comprising:
   a network interface configured to couple to a computer network; and
   a processor coupled to the network interface, the processor being further configured to couple to a memory, the memory being configured to store at least one of a first media file, a second media file, and a third media file, wherein at least two of the first to third media files are configured differently from one another;
   wherein the processor is further configured to generate a single media stream by at least:
      accessing at least one of the first to third media files from the memory;
      sequentially applying at least one filter to at least one of the first to third media files;
      sequentially reformatting at least one of the first to third media files such that each of the first to third media files substantially conforms to a common format;

ordering each of the first to third media files according to a selectable metric;

aggregating at least the ordered first to third media files together to generate the single media stream;

accessing fourth to $n^{th}$ media files for potential inclusion in the single media stream;

omitting any of the first to $n^{th}$ media files from inclusion in the single media stream that are determined to be at least one of too dark, too light, or too blurry, according to predetermined respective thresholds; and making the single media stream accessible to the computer network over the network interface.

18. The electronic device of claim 17, wherein the electronic device comprises the memory.

19. The electronic device of claim 17, wherein:

the memory is coupled to the computer network; and the processor is configured to use the network interface to access the memory over the computer network.

* * * * *